(12) United States Patent
Yoon et al.

(10) Patent No.: US 11,278,180 B2
(45) Date of Patent: Mar. 22, 2022

(54) DISHWASHER

(71) Applicant: LG Electronics Inc., Seoul (KR)

(72) Inventors: Sangheon Yoon, Seoul (KR); Daegyu Kim, Seoul (KR)

(73) Assignee: LG Electronics Inc., Seoul (KR)

(*) Notice: Subject to any disclaimer, the term of this patent is extended or adjusted under 35 U.S.C. 154(b) by 316 days.

(21) Appl. No.: 16/271,427

(22) Filed: Feb. 8, 2019

(65) Prior Publication Data

US 2019/0246870 A1 Aug. 15, 2019

(30) Foreign Application Priority Data

Feb. 9, 2018 (KR) .................. 10-2018-0016514

(51) Int. Cl.
*A47L 15/48* (2006.01)

(52) U.S. Cl.
CPC ........... *A47L 15/483* (2013.01); *A47L 15/486* (2013.01); *A47L 15/488* (2013.01); *A47L 2501/10* (2013.01); *A47L 2501/11* (2013.01); *A47L 2501/12* (2013.01)

(58) Field of Classification Search
CPC .... A47L 15/486; A47L 15/488; A47L 15/483; A47L 2501/11; A47L 2501/10; A47L 15/4221; A47L 2501/12
See application file for complete search history.

(56) References Cited

U.S. PATENT DOCUMENTS

| | | | |
|---|---|---|---|
| 5,337,500 A * | 8/1994 | Enokizono | A47L 15/486 34/225 |
| 5,355,900 A * | 10/1994 | Sakata | A47L 15/486 134/107 |
| 8,496,760 B2 * | 7/2013 | Bertsch | A47L 15/483 134/18 |
| 2003/0140517 A1* | 7/2003 | Schmid | A47L 15/0034 34/78 |
| 2007/0157954 A1* | 7/2007 | Classen | A47L 15/481 134/56 D |

(Continued)

FOREIGN PATENT DOCUMENTS

| CN | 105147219 | 12/2015 |
|---|---|---|
| CN | 105520704 | 4/2016 |

(Continued)

OTHER PUBLICATIONS

Extended European Search Report in European Application No. 19156104.2, dated Jul. 10, 2019, 9 pages.

(Continued)

*Primary Examiner* — Benjamin L Osterhout
(74) *Attorney, Agent, or Firm* — Fish & Richardson P.C.

(57) ABSTRACT

A dishwasher includes: a cabinet defining an external appearance of the dishwasher; a tub disposed in the cabinet to form a space where to wash dishes; a heat exchange module disposed between the tub and the cabinet to form a space in which external air flows, and configured to supply the external air to the tub; and a condensing module disposed between the heat exchange module and the cabinet and configured to perform heat exchange of air discharged from the tub with the external air flowing in the heat exchange module and discharge heat-exchanged air to an outside of the cabinet.

18 Claims, 9 Drawing Sheets

(56) References Cited

U.S. PATENT DOCUMENTS

| | | | |
|---|---|---|---|
| 2008/0006308 A1* | 1/2008 | Classen | A47L 15/483 |
| | | | 134/95.2 |
| 2008/0087307 A1* | 4/2008 | Han | A47L 15/4257 |
| | | | 134/104.4 |
| 2008/0283099 A1* | 11/2008 | Peukert | A47L 15/488 |
| | | | 134/99.1 |
| 2009/0095332 A1* | 4/2009 | Lee | A47L 15/486 |
| | | | 134/105 |
| 2013/0152981 A1* | 6/2013 | Bertsch | A47L 15/0013 |
| | | | 134/105 |
| 2017/0319045 A1* | 11/2017 | Wu | A47L 15/4257 |

FOREIGN PATENT DOCUMENTS

| | | |
|---|---|---|
| CN | 106264409 | 1/2017 |
| EP | 1447042 | 8/2004 |
| EP | 3257425 | 12/2017 |
| FR | 2491320 | 4/1982 |

OTHER PUBLICATIONS

Australian Office Action in Australian Application No. 2019200883, dated Jul. 31, 2019, 5 pages.

\* cited by examiner

DISHWASHER

CROSS-REFERENCE TO RELATED APPLICATION

This application claims the priority benefit of Korean Patent Application No. 10-2018-0016514, filed on Feb. 9, 2018 in the Korean Intellectual Property Office, the disclosure of which is incorporated herein by reference.

FIELD

The present disclosure relates to a dishwasher and, more particularly, to a dishwasher which heats dry external air to introduce the air into a tub and condenses humid air in the tub to discharge the condensed air to the outside to dry dishes in the tub.

BACKGROUND

A dishwasher is an apparatus that washes dishes using water and detergent through washing, rinsing, and drying courses in a space where the dishes are held. With the washing and rinsing courses using water and detergent, food remains or other foreign substances can be removed from the dishes. In addition, the dishes can be completely washed with the drying course in which moisture remaining in the dishes are removed.

The drying course of the dishwasher may consist of a step of increasing temperature of water to be sprayed toward dishes such that temperature of the dishes increases to facilitate evaporation of moisture on the dishes, and a step of removing the evaporated moisture by condensing the moisture in a cooling duct provided inside or outside of a wash tank or by making the moisture to be absorbed by an absorbent.

In the case of discharging humid air in a tub to the outside, it is possible to quickly dry dishes in the dishwasher but this may lead to mold to grow around the dishwasher due to a great amount of discharged humid air or damage outer components of the dishwasher.

In order to enhance performance of drying the inside of the tub, an additional condensing flow path may be formed to discharge humid air from the tub. However, condensing humid vapor discharged from the tub simply by forming a flow path may result in degradation of condensing performance.

In addition, if humid air not properly condensed is discharged to the outside, it may cause a possibility to damage the surroundings of the dishwasher.

Korean Patent Application No. 10-2015-0168759 discloses an air blower provided on the top of a tub, the air blower which spray out air jet. Since the air blower opens a door to discharge humid vapor and the air get from the tub, and there is a problem that an excessive amount of humid vapor may be discharged from the tub.

SUMMARY

One object of the present disclosure is to provide a dishwasher that processes humid air in a tub, thereby drying the inside of the tub efficiently.

Another object of the present disclosure is to provide a dishwasher that does not discharge humid vapor to the outside of the dishwasher while processing humid air in a tub to dry the inside of the tub.

Yet another object of the present disclosure is to provide a dishwasher that removes some of humid vapor in a tub while processing humid air in the tub to dry the inside of the tub.

Yet another object of the present disclosure is to provide a dishwasher having a structure which enables processing condensed water generated when humid air in a tub is processed to dry the inside of the tub.

The technical objects of the present disclosure are not limited to the aforementioned objects, and other unmentioned objects will be apparent to a person having ordinary skill in the art from the following description.

In order to achieve the above objects, in one general aspect of the present disclosure, there is provided a dishwasher including: a cabinet defining an external appearance of the dishwasher; a tub disposed in the cabinet to form a space where to wash dishes; a heat exchange module disposed between the tub and the cabinet to form a space in which external air flows, and configured to supply the external air to the tub; and a condensing module disposed between the heat exchange module and the cabinet and configured to perform heat exchange of air discharged from the tub with the external air flowing in the heat exchange module and discharge the heat-exchanged air to an outside of the cabinet.

The dishwasher may further include a heating module configured to heat air having passed through the heat exchange module and supply the heated air to an inside of the tub. Accordingly, it is possible to secondarily heat air supplied to the inside of the tub.

The heating module may include: a heater configured to heat the flowing air; and a hot air tube configured to deliver the air heated by the heater to the inside of the tub. Accordingly, air supplied from the outside may be heated and supplied to the inside of the tub through the hot air tube.

An ascending flow path, along which flowing air ascends, and a descending flow path, along which the air flown from the ascending flow path descends, may be formed in the hot air tube, and the heater may be disposed below the ascending flow path. Accordingly, it is possible to prevent water in the tub from flowing into the heater.

The dishwasher may further include an external air supply fan module configured to deliver external air to an inside of the tub through the heat exchange module. Accordingly, external air may be supplied to the inside of the tub through the heat exchange module.

The condensing module may include: a condensing chamber disposed between the cabinet and the heat exchange module to form a space in which air discharged from the tub flows; and a condensing chamber connecting pipe disposed on an upper side of the tub to connect an inside of the tub and the condensing chamber. The humid air in the tub may be discharged to the top of the tub and flow into the condensing chamber.

The condensing chamber may contact the heat exchanger, in which external air flows, through one side surface of the condensing chamber and contact the cabinet through the other side surface of the condensing chamber. Accordingly, humid air flowing in the condensing chamber may be condensed through the both side surfaces of the condensing chamber.

A flow path guide, which guides air flowing in the condensing chamber, and a condensed water guide, which guides movement of condensed water generated in the condensing chamber, may be formed in the condensing chamber, and the condensed water guide may be disposed below the flow path guide. Accordingly, condensed water in air having passed through the flow path guide may flow along the condensed water guide.

A condensed water discharge hole disposed below the condensed water guide to discharge the condensed water generated in the condensing chamber to the inside of the tub may be formed in the condensing chamber, and a condensed water discharge guide for guiding the condensed water flowing along the condensed water guide toward the condensed water discharge hole may be formed in the condensing chamber. Accordingly, water condensed in the condensing chamber may flow into the tub.

An internal air hole may be formed on an upper surface of the tub such that air in the tub flows into the condensing module, an external inflow hole may be formed on a side surface of the tub such that air flowing in the heat exchange module flows into the tub, and the condensed water discharge guide may guide condensed water created in the condensing chamber toward the external air inflow hole. Accordingly, the condensed water may flow into the tub through the external air inflow hole.

The dishwasher according to the present disclosure may further include: a condensing chamber connecting pipe connected to the internal air discharge hole formed on an upper surface of the tub to deliver air from the tub to the condensing module, wherein the condensing chamber connecting pipe has a sloped surface at a portion extending upward from the internal air discharge hole, the sloped surface whose increases upward in area. Accordingly, it is possible to prevent wash water sprayed upward of the tub from flowing into the condensing chamber.

The heat exchange module may include: a heat exchange chamber disposed between the condensing module and the tub to form a space in which external air flows; and an external air inflow part disposed in front of the heat exchange chamber and having an external air introduction hole formed at a front thereof to introduce external air. Accordingly, the external air may be introduced from the front and delivered to the heat exchange chamber.

The external air inflow hole may be formed at a front lower portion of the external air inflow part. Accordingly, cold external air may be introduced into the heat exchange chamber.

A heat exchange chamber-flow path guide for guiding the external air, introduced from the front, in a rearward and upward direction may be formed in the heat exchange chamber. Accordingly, a length of a flow path of external air flowing in the heat exchange chamber may be increased.

The dishwasher may further include an exhaust fan module configured to operate an exhaust fan disposed therein to discharge air flowing in the condensing module to an outside of the cabinet. Accordingly, humid air in the tub may be discharged to the outside.

In another general aspect of the present disclosure, there is provided a dishwasher, including: a cabinet defining an external appearance of the dishwasher; a tub disposed in the cabinet to form a space in which dishes are to be processed; an external air supply unit configured to perform heat exchange of the air introduced from an outside with air discharged from the tub and supply the heat-exchanged air to an inside of the tub; and an air discharge unit configured to condense air in the tub through heat exchange with the external air flowing in the external air supply unit and discharge the condensed air to an outside.

The details of other embodiments are included in the following description and the accompanying drawings.

The dishwasher of the present disclosure has one or more effects as below.

First, a heat exchanger in which external air flows is disposed between a tub and a condensing module in which humid vapor discharged from the tub flows. Accordingly, external dry air discharged from tub is heated by the heat exchanger and flows into the tub, and humid air in the tub is condensed by the condensing module and then discharged to the outside. Therefore, there is an advantage in drying the inside of the tub more quickly and more efficiently.

Second, air flowing into the tub and air discharged to the outside of the dishwasher are thermally exchanged to be heated and condensed. Accordingly, there is an advantage in improving energy efficiency of the dishwasher by enabling air to be thermally exchanged without using an additional refrigerant device.

Third, since the condensing module is disposed between cabinet and the heat exchanger, in which external air flows, the condensing module is capable of perform heat exchange on both side surfaces. Accordingly, as humid air in the tub is condensed and discharged to the outside, air is discharged to the outside without humidity. Therefore, there is an advantage in preventing mold from growing on the outside of the dishwasher is prevented.

Fourth, the heat exchanger into which external air is introduced is provided with external air on one side surface, and thus, humid air in the tub can be condensed. Accordingly, there is an advantage in drying the inside of the tub effectively.

Fifth, water condensed in the condensing module is allowed to flow to the inside of the tub, and thus, water is prevented from being filled in the condensing module. Accordingly, there is an advantage in keeping the inside of the condensing module clean.

Effects of the present disclosure should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION

Figure 1:
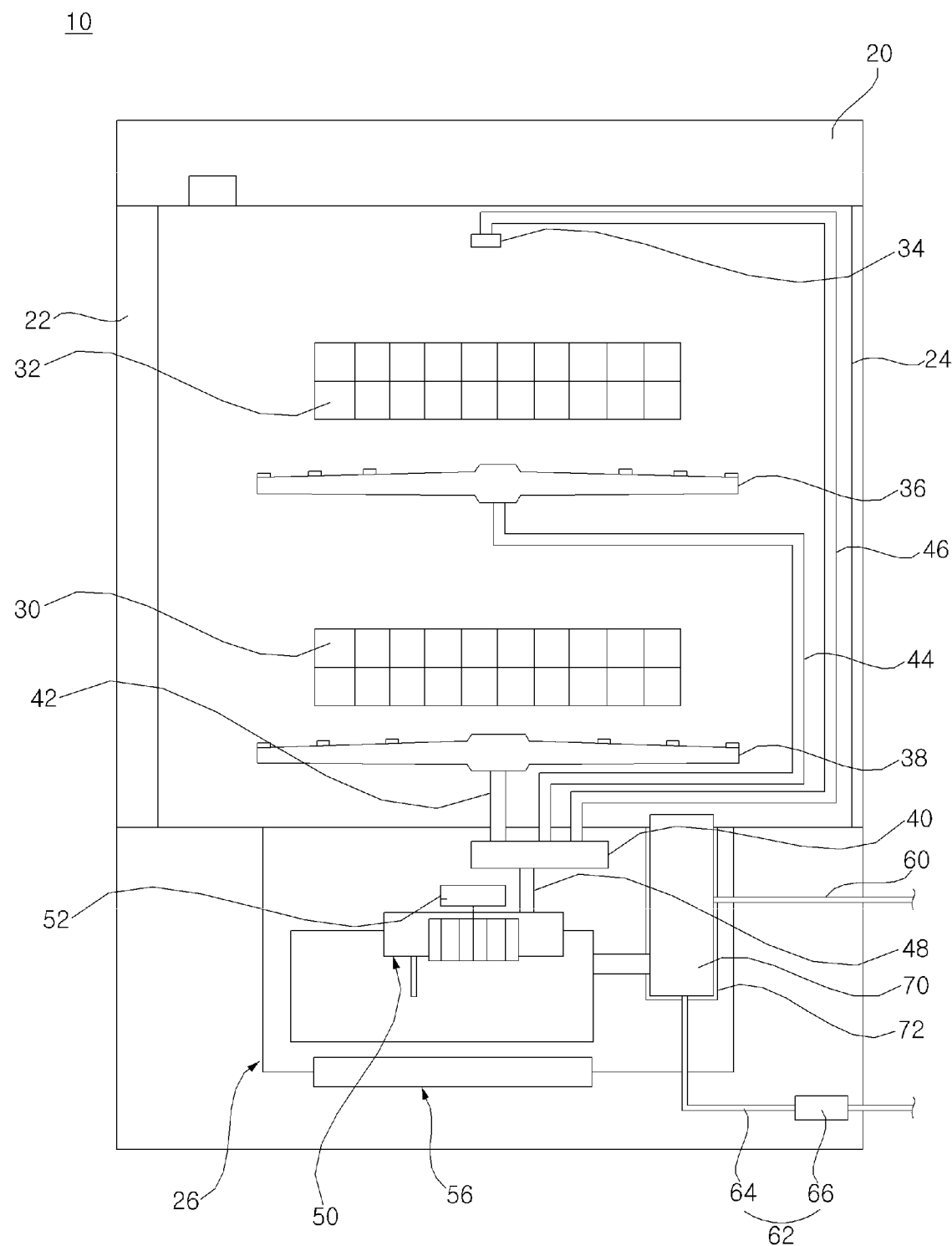
FIG. 1 is a schematic front cross-sectional view of a dishwasher according to an embodiment of the present disclosure.

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the disclosure to those of ordinary skill in the art to which the present disclosure pertains. The present disclosure is defined only by the scope of the claims. In the drawings, the thickness of layers and regions may be exaggerated for clarity. Throughout the drawings, like numbers refer to like elements.

Hereinafter, a dishwasher according to embodiments of the present disclosure will be described with reference to the accompanying drawings.

<Component of Dishwasher>

FIG. 1 is a schematic front cross-sectional view of a dishwasher according to an embodiment of the present disclosure.

Referring to FIG. 1, a dishwasher 10 according to the present embodiment includes a cabinet 20 defining an external appearance of the dishwasher 10, a door 22 coupled to the cabinet 20 to open and close the inside of the cabinet 20, and a tub 24 installed in the cabinet 20 to handle dishes positioned in the tub 24. The cabinet 20 and the tub 24 are in a structure having an opened front surface on which the door 22 is disposed.

The dishwasher 10 according to the present embodiment may include a dispenser (not shown) for storing detergent introduced by a user and introducing the detergent into the tub 24 in a washing step. The dispenser may be disposed in the door 22.

The cabinet 20 according to the present embodiment may define an external appearance of the dishwasher 10, and one side of the cabinet 20 may be opened. An external air inlet 122, through which air is introduced into an external air inflow part 120, may be formed on one side of the cabinet 20 according to the present embodiment. In addition, an external air exhaust port (not shown) through which heat-exchanged external air is exhausted may be formed on the other side of the cabinet 20.

In order to wash dishes, the tub 24 forms a space where the dishes are to be placed. The tub 24 according to the present embodiment may have an air guide hole (not shown) on one side thereof to discharge air to the outside when pressure in the tub increase, thereby reducing the pressure.

The tub 24 according to the present embodiment is disposed in the cabinet 20. Together with the cabinet 20, the tub 24 according to the present embodiment may form a space where a heat exchange chamber 112 and a condensing chamber 212 are disposed, which will be described later. An internal air discharge hole 80 through which air is discharged from the tub 24 toward the air discharge unit 200 is formed on the tub 24 according to the present embodiment. An external air inflow hole 82 through which air flows from the external air inflow part 120 into the tub 24 is formed on a side surface of the tub 24 according to the present embodiment.

The dishwasher 10 according to the present embodiment includes: a rack 30 and 32 for accommodating dishes in the tub 24, a spray module for spraying wash water toward dishes accommodated in the rack 30 and 32; a sump 26 for supplying the wash water to the spray module; and a wash pump 50 for pumping the wash water stored in the sump 26.

The spray module serves to spray wash water toward dishes. The spray module includes: a spray nozzle 34, 36, and 38; and a supply pipe 42, 44, and 46 which connects the wash pump 50 and the spray nozzle 34, 36, and 38.

The dishwasher 10 further includes a wash motor 52 which drives the wash pump 50, and the wash motor 52 may be implemented as a Brushless Direct Current (BLDC) motor of which the number of rotations is controllable. Since the wash motor 52 is a BLDC motor, it is possible to set a target revolution per minute (RPM). If the rpm of the BLDC motor changes, a transfer force of the wash pump 50 changes.

The dishwasher 10 according to the present embodiment may further include: a water supply module 60 for supplying water to the sump 26 or the spray module; a drain module 62 connected to the sump 26 to discharge wash water to the outside; a filter module 70 installed in the sump 26 to filter the wash water; and a wash water heating module 56 installed in the sump 26 to heat the wash water.

The rack 30 and 32 for accommodating subjects to wash, such as dishes, are provided in the tub 24. The dishwasher 10 according to the present embodiment may include at least one rack 30 and 32. The rack 30 and 32 according to the present embodiment includes a lower rack 32 disposed in a low side of the tub 24, and an upper rack 30 disposed above the lower rack 32.

The dishwasher 10 according to the present embodiment may include at least one spray nozzles 34, 36, and 38. The dishwasher 10 according to the present embodiment includes: a lower nozzle 38 disposed in the tub 24 to wash a subject to wash accommodated in the lower rack 32; an upper nozzle 36 for washing a subject to wash accommodated in the upper rack 30; and a top nozzle 34 disposed in the highest point on the tub 24 to spray wash water.

The supply pipe 42, 44, and 46 according to the present embodiment connects the sump 26 and the spray nozzle 34, 36, and 38. If the wash pump 50 operates to pump wash water stored in the sump 26, the wash water is supplied to the spray nozzle 34, 36, and 38. The supply pipe 42, 44, and 46 according to the present embodiment includes: a first pipe 42 through which wash water is supplied to the lower nozzle 38; a second pipe 44 through which wash water is supplied to the upper nozzle 36; and a third pipe 46 through which wash water is supplied to the top nozzle 34.

The dishwasher 10 according to the present embodiment includes a flow path switching part 40 for supplying wash water stored in the sump 26 to the first pipe 42, the second pipe 44, and the third pipe 46.

The flow path switching part 40 according to the present embodiment includes a flow path switching motor (not shown) which generates a rotational force, and a rotary plate which rotates by the flow path switching motor to adjust a flow of wash water. The rotary plate according to the present embodiment may selectively open and close a plurality of connection holes (not shown) formed at a point where the plurality of supply pipes 42, 44, and 46 is branched. A plurality of switch holes (not shown) may be formed on the rotary plate. The rotary plate rotates in phases by the flow path switching motor. If the rotary plate rotates by the flow path switching motor, wash water pumped by the wash pump 50 may be sprayed toward at least one of the plurality of spray nozzles 34, 36, and 38 as the plurality of switch holes formed on the rotary plate is disposed at a position corresponding to at least one of a plurality of connection holes.

Wash water discharged from the sump 26 through the wash pump 50 moves to the flow path switching part 40 through a pump pipe 48. The flow path switching part 40 may supply wash water, introduced from the sump 26, to at least one of the first pipe 42, the second pipe 44, and the third pipe 46.

The upper nozzle 36 may be disposed below the upper rack 30. It is preferable that the upper nozzle 36 is rotatably coupled to the second pipe 44 so that the upper nozzle 36 rotates by a repulsive force of wash water when the wash water is sprayed from the upper nozzle 36.

The top nozzle 34 is disposed at a position higher than that of the upper rack 30. The top nozzle 34 is disposed in an upper side of the tub 24. The top nozzle 34 is supplied with wash water from the third pipe 45, and sprays the wash water toward the upper rack 30 and the lower rack 32.

The water supply module 60 is configured to be supplied with water from the outside and supply the water to the sump 26. In the present embodiment, the water supply module 60 is configured to supply water through the filter module 70 to the sump 26. The drain module 62 is configured to discharge wash water stored in the sump 26 to the outside, and the drain module 62 includes a drain pipe 64 and a drain pump 66.

The filter module 70 serves to filter out foreign substances, such as food remains, contained in wash water. The filter module 70 is dispose on a flow path through which the wash water is introduced from the tub 24 and the sump 26.

To this end, a filter mounting part 72 into which the filter module 70 is installed may be formed in the sump 26, and a filter flow path for connecting the filter mounting part 72 and the sump 26 may be disposed in the sump 26.

The dishwasher 10 according to the present embodiment may include a water level sensing part which senses the level of water in the tub 24. The water level sensing part according to the present embodiment may include a floater (not shown) which detects the level of water in the tub 24, and a water level sensor (not shown) which senses a height of the floater to sense a water level.

The dishwasher 10 according to the present embodiment may further include: an input unit (not shown) which receives a command from a user; and a display unit (not shown) which displays a progress status of the dishwasher 10 or a notification to a user. The input unit may utilizes a touch input or a button input, and the display unit may use a display, a warning lamp, or the like.

Figure 2:
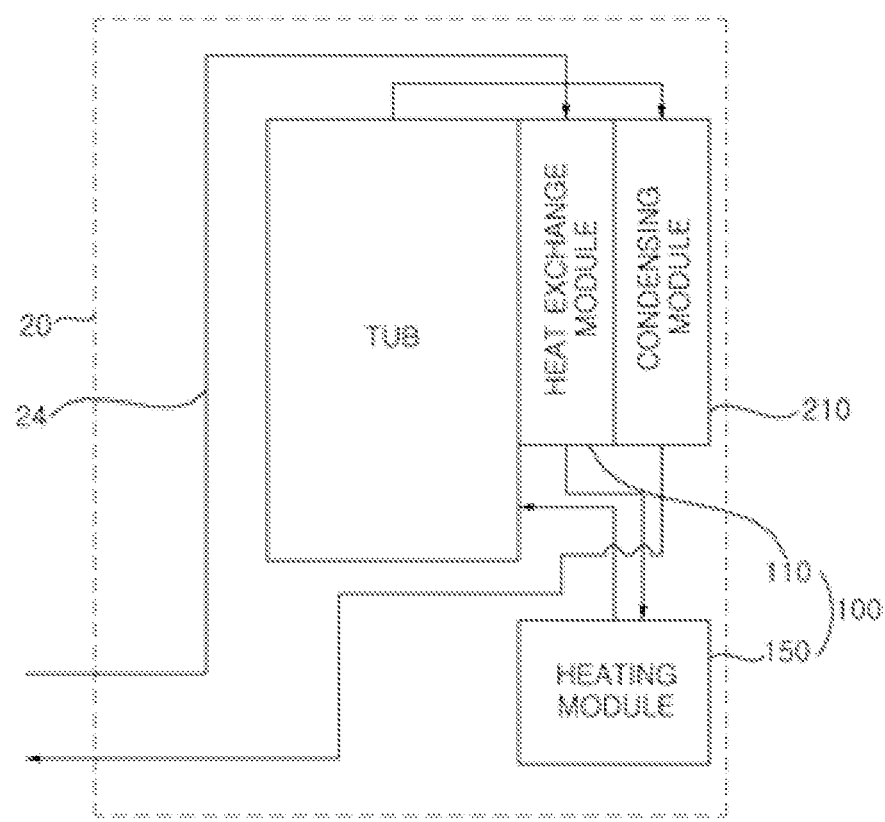
FIG. 2 is a schematic view for explanation of a relationship between a tub, a heat exchange module, and a external air supply unit in a cabinet according to an embodiment of the present disclosure.
Figure 3:
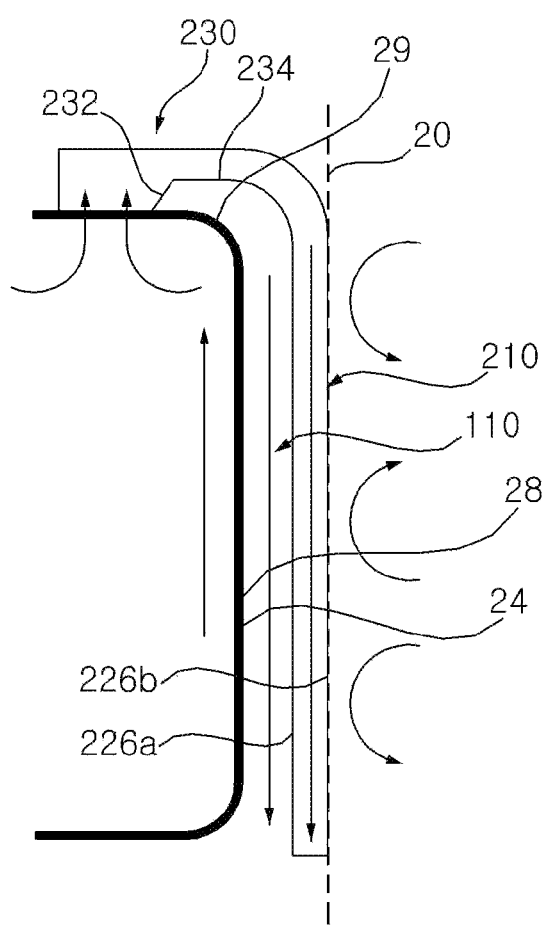
FIG. 3 is a schematic view for explanation of a relationship between a tub, a condensing chamber, and a heat exchanging chamber according to an embodiment of the present disclosure.
Figure 4:
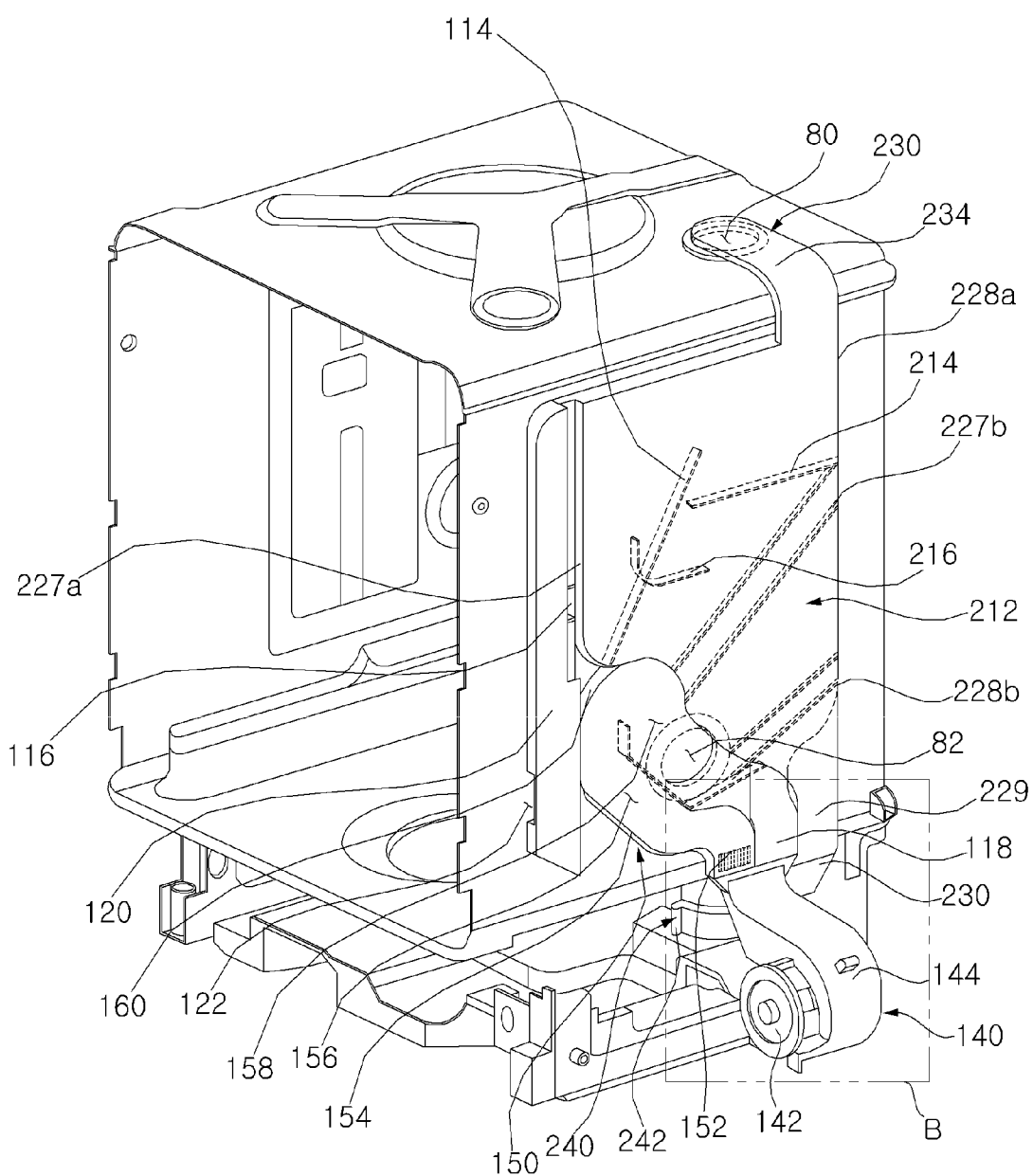
FIG. 4 illustrates a perspective view illustrating a circulator, a heat exchanger, and a tub according to an embodiment of the present disclosure.
Figure 5:
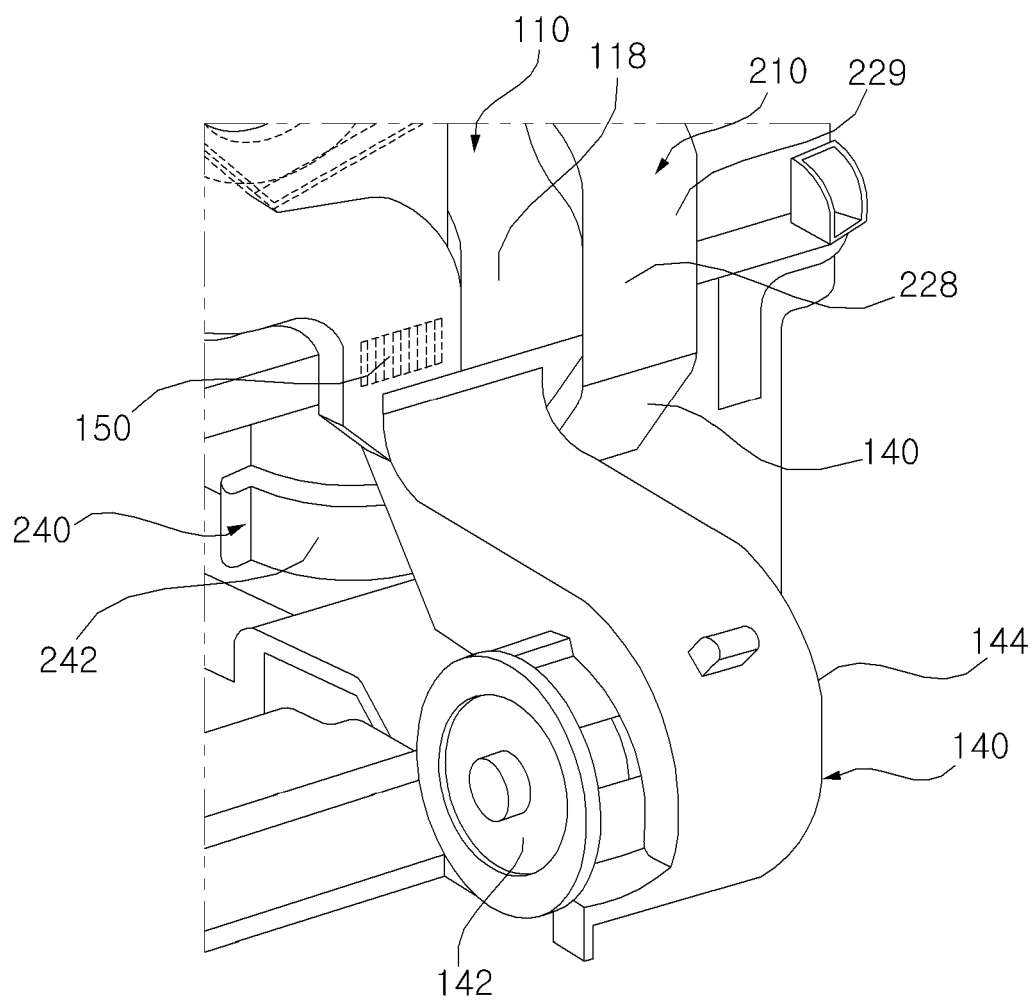
FIG. 5 is a detailed view of a portion B shown in FIG. 4.
Figure 6:
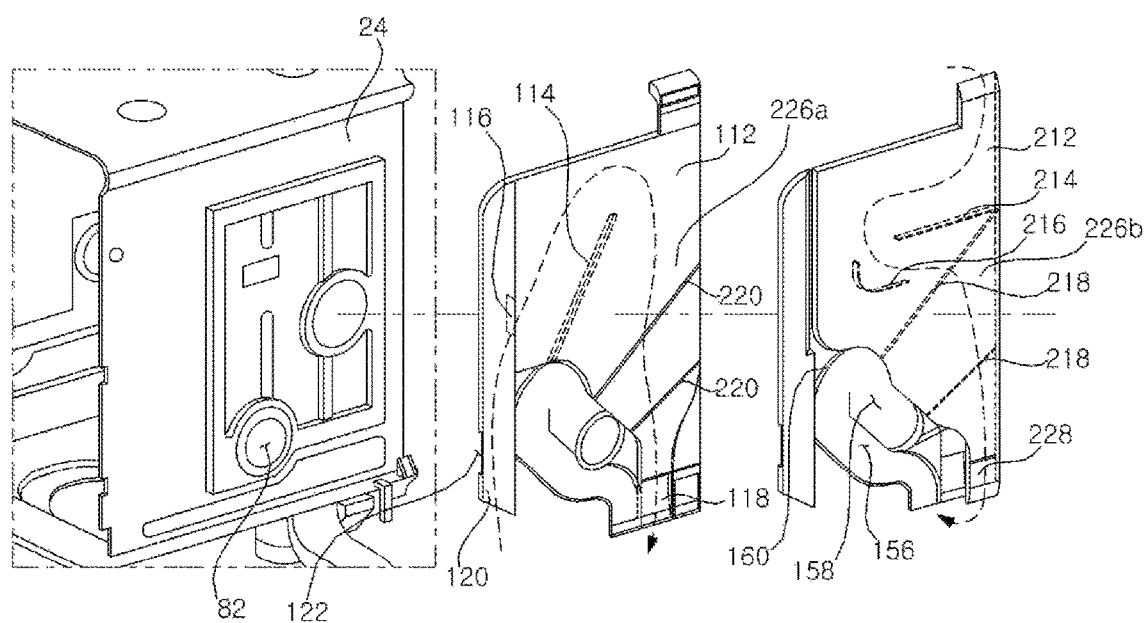
FIG. 6 is a diagram for explanation of a configuration, which forms a heat exchanging chamber and a condensing chamber, according to an embodiment of the present disclosure.
Figure 7:
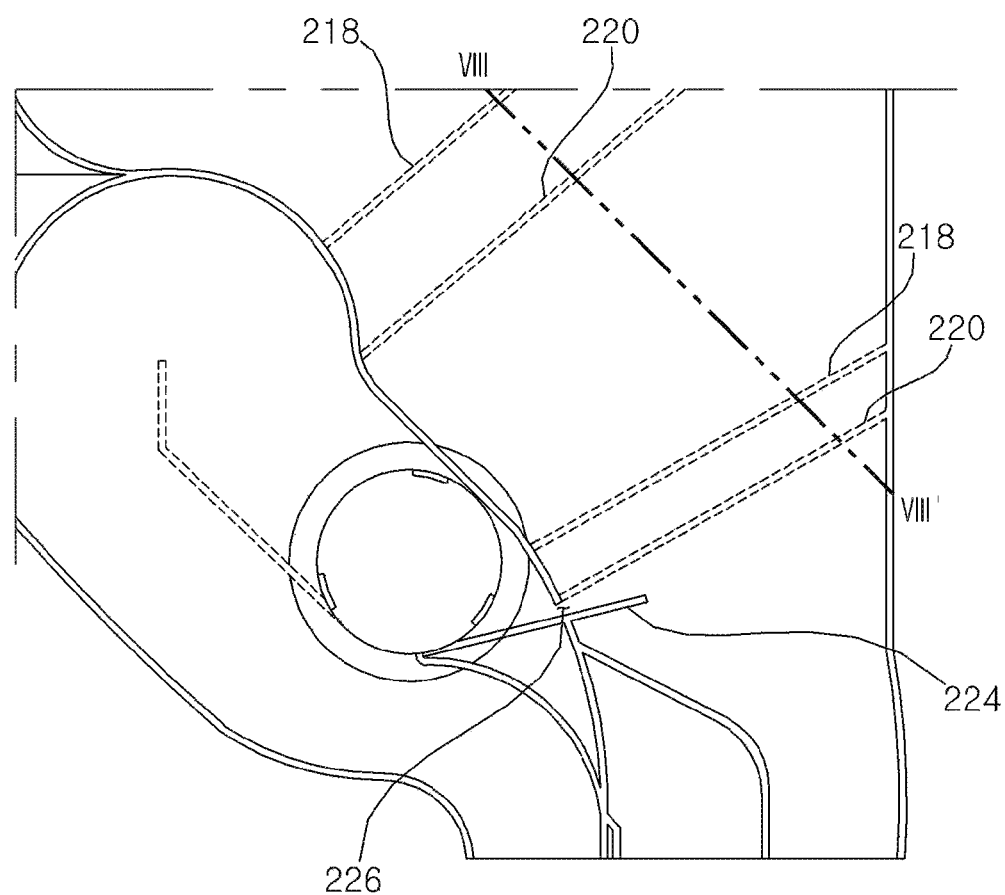
FIG. 7 is a diagram for explanation of a different portion of a condensing chamber and a structure of a heating module according to an embodiment of the present disclosure.
Figure 8:
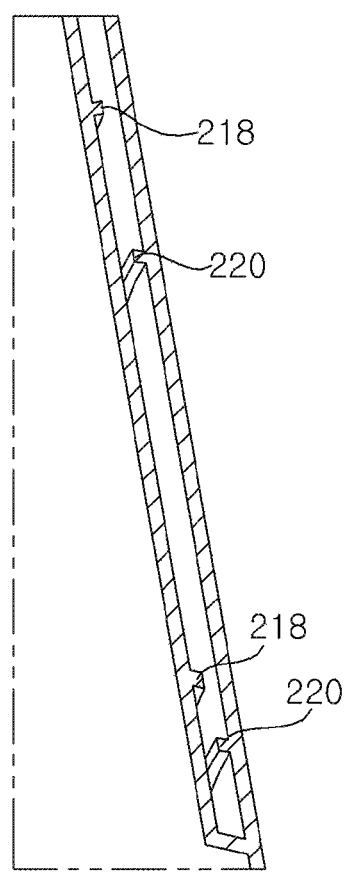
FIG. 8 is a perspective view of a cross-section cut along line VIII-VIII' shown in FIG. 7.
Figure 9:
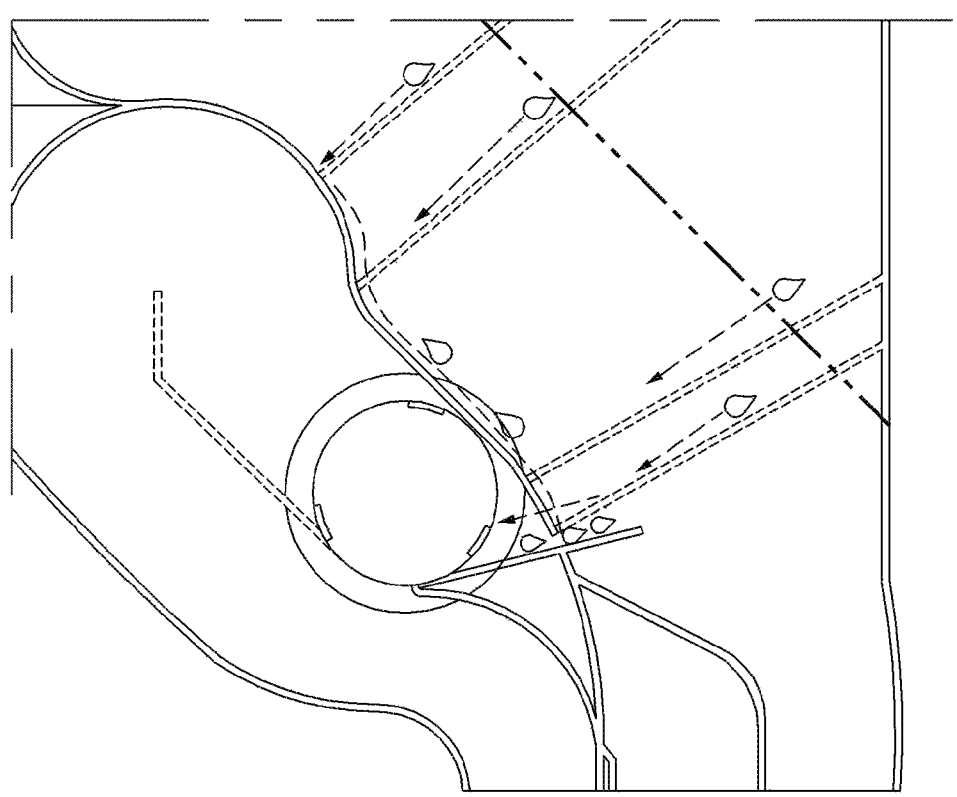
FIG. 9 is a diagram for explanation of movement of condensed water in the structure shown in FIG. 7.

FIG. 2 is a schematic view for explanation of a relationship between a tub, a heat exchange module, and a external air supply unit in a cabinet according to an embodiment of the present disclosure. FIG. 3 is a schematic view for explanation of a relationship between a tub, a condensing chamber, and a heat exchanging chamber according to an embodiment of the present disclosure. FIG. 4 illustrates a perspective view illustrating a circulator, a heat exchanger, and a tub according to an embodiment of the present disclosure. FIG. 5 is a detailed view of a portion B shown in FIG. 4. FIG. 6 is a diagram for explanation of a configuration, which forms a heat exchanging chamber and a condensing chamber, according to an embodiment of the present disclosure. FIG. 7 is a diagram for explanation of a different portion of a condensing chamber and a structure of a heating module according to an embodiment of the present disclosure. FIG. 8 is a perspective view of a cross-section cut along line VIII-VIII' shown in FIG. 7. FIG. 9 is a diagram illustrating a flow of condensed water in the structure shown in FIG. 7.

Hereinafter, the structure of a dishwasher including a circulator and a heat exchanger according to the present embodiment will be described with reference to FIGS. 2 to 9.

The dishwasher 10 according to the present embodiment includes: an external air supply unit 100 which heats external air and supplies the heated air to the inside of the tub 24; and an air discharge unit 200 which condenses air in the tub 24 and discharges the condensed air to the outside of the tub 24. Air discharged to the air discharge unit 200 according to the present embodiment is condensed through heat exchange with external air introduced to the external air supply unit 100.

The external air supply unit 100 according to the present embodiment dries dishes in the tub 24 by introducing air from the outside of the dishwasher 10 (hereinafter, referred to as "external air"). The external air supply unit 100 according to the present embodiment introduces air from the outside, and enables the air to flow into the tub 24 through a heat exchange module 110, an external air supply fan module 140, and a heating module 150. The external air supply unit 100 secondarily heats external dry air through the heat exchange module 110 and the heating module 150 so that hot air is supplied to the inside of the tub 24, thereby drying dishes placed in the tub 24. Humid air in the tub 24 is condensed by the air discharge unit 200 and discharged to the outside, and hot dry air is introduced through the external air inflow part 120 from the outside to the inside of the tub 24 to dry dishes placed in the tub 24.

The external air supply unit 100 according to the present embodiment includes: the heat exchange module 110 which primarily heats air, introduced from the outside, through heat exchange with a condensing module which will be described later; the heating module 150 which secondarily heats the air, which has passed through the heat exchange module 110, through a heater 152; and the external air supply fan module 140 which operates to enable external air to pass through the heat exchange module 110 and the heating module 150 and then flow to the inside of the tub 24.

<Heat Exchange Module>

The heat exchange module 110 according to the present embodiment is disposed between the tub 24 and a condensing chamber 212 which will be described later. The heat exchange module 110 according to the present embodiment performs heat exchange of hot vapor flowing in the tub 24 or hot vapor discharged from the tub 24 and flowing in the condensing chamber 212 with external air. The heat exchange module 110 according to the present embodiment suctions external air, performs heat exchange with the condensing module 210, and delivers heat-exchanged air to the heating module 150.

The heat exchange module 110 according to the present embodiment includes: the heat exchange chamber 112 disposed between the tub 24 and the condensing chamber 212 of the condensing module 210 to perform heat exchange with the condensing module 210; and the external air inflow part 120 disposed in front of the heat exchange chamber 112 and having the external air inlet 122 formed therein, the external air inlet 122 through which external air is introduced.

The heat exchange chamber 112 according to the present embodiment is disposed between the tub 24 and the condensing chamber 212. Air introduced from the outside flows in the heat exchange chamber 112 to exchange heat with air flowing in the condensing chamber 212. In addition, air introduced from the outside may flow in the heat exchange chamber 112 to condense air flowing in the tub 24.

A heat exchange chamber inflow port 116, through which external air is introduced, is formed at the front of the heat exchange chamber 112 according to the present embodiment, and a heat exchange chamber discharge port, through which air is discharged, is formed in a lower side of the heat exchange chamber 112 according to the present embodiment. The heat exchange chamber inflow port 116 according to the present embodiment may be formed at a position higher than that of the external air inlet 122 of the external air inflow part 120.

A heat exchange chamber-flow path guide 114, which guides air introduced from the front in a rearward and upward direction, is disposed in the heat exchange chamber 112 according to the present embodiment. External air introduced by the heat exchange chamber-flow path guide 114 into the heat exchange chamber inflow port 116 flows upward and is then discharged through the heat exchange chamber discharge part 216 in which the heat exchange chamber discharge port is formed. The heat exchange chamber exhaust part 118 according to the present embodiment is disposed in front of the condensing chamber exhaust part 229 of the condensing chamber 212.

The heat exchange chamber 112 according to the present embodiment may exchange heat with the condensing chamber 212 through one side surface of the heat exchange chamber 112 to condense air flowing in the condensing chamber 212. In addition, the heat exchange chamber 112 may exchange heat with air flowing in the tub 24 through the other side surface of the heat exchange chamber 112 to condense the air flowing in the tub 24, thereby removing humidity in the tub 24.

The external air inflow part 120 according to the present embodiment is disposed in front of the heat exchange chamber 112. The external air inflow part 120 according to the present embodiment is longitudinally vertically disposed in front of the heat exchange chamber 112. The external air inflow part 120 according to the present embodiment introduces external air from a front lower side of the dishwasher 10, and enables the introduced external air to flow upward so that the air flows into the heat exchange chamber 112.

<Heating Module>

The heating module 150 according to the present embodiment heats air having passed through the heat exchange module 110. The heating module 150 according to the present embodiment heats flowing air and delivers the heated air to the inside of the tub 24.

The heating module 150 according to the present embodiment may include a heater 152 which heats flowing air, and a hot air tube 154 which delivers heated air to the inside of the tub 24. The heater 152 according to the present embodiment is disposed at the entrance of the hot air tube 154.

An ascending flow path 156, along which air ascends, and a descending flow path 158, along which the air flown from the ascending flow path descends, are formed in the hot air tube 154 according to the present embodiment. The heater 152 according to the present embodiment is disposed below the ascending flow path 156. An external air inflow hole 82 communicating with the tub 24 is formed at an end portion of the descending flow path 158. The hot air tube 154 according to the present embodiment includes a flexure 160 that connects the ascending flow path 156 and the descending flow path 156. The flexure 160 is disposed on the upper side of the ascending flow path 156 to guide air flowing in the ascending flow path 156 toward the descending flow path 158. Due to the descending flow path 158 and the flexure 160, wash water sprayed in the tub 24 toward the external air inflow hole 82 may be prevented from flowing into the heater 152. An inflow end of the ascending flow path 156 according to the present embodiment may be disposed in front of the heat exchange exhaust part 118.

<External air Supply Fan Module>

The external air supply fan module 140 according to the present embodiment suctions external air flowing in the heat exchange chamber 112, and delivers the suctioned air to the external air inflow hole 82 formed on one side of the tub 24. The external air supply fan module 140 according to the present embodiment enables air flowing in the heat exchange module 110 to flow into the heating module 150.

The external air supply fan module 140 according to the present embodiment includes: the external air supply fan housing 144 which connects the heat exchange module 110 and the heating module 150; and an external air supply fan 142 which is disposed in the external air supply fan housing 144 to enable air to flow. The external air supply fan module 140 connects the heat exchange chamber exhaust part 118 of the heat exchange chamber 112 and the ascending flow path 156 of the heating module 150.

<Air Exhaust Unit>

The air discharge unit 200 according to the present embodiment condenses humid air in the tub 24 to remove humidity from the humid air so that dry air is discharged to the outside. The air discharge unit 200 according to the present embodiment enables air, discharged from the tub 24 through the internal air discharge hole 80 formed on the tub 24, to pass through the condensing module 210, so that the discharged air exchanges heat with external air passing through the heat exchange chamber 112 and is then discharged to the outside of the cabinet 20.

The air discharge unit 200 according to the present embodiment includes: the condensing module 210 which condenses humid air discharged from the tub 24 through heat exchange with external air; and an exhaust fan module 240 which discharges air having passed through the condensing module 210 to the outside of the cabinet 20. Humid vapor discharged from the tub 24 may pass through the condensing module 210, and accordingly, dry air may be discharged to the outside.

<Condensing Module>

The condensing module 210 according to the present embodiment enables air discharged from the tub 24 to exchange heat with external air flowing in the heat exchange module 110. In order to enable the air discharged from the tub 24 to exchange heat with the external air, the condensing module 210 according to the present embodiment includes: the condensing chamber 212 which is spaced a predetermined distance apart from a side surface 28 of the tub 24; a flow path guide 214 and 216 which guides air flowing in the condensing chamber 212; and a condensed water guide 218 and 220 which guides condensed water in the condensing chamber 212. The condensing module 210 according to the present embodiment may further include a condensing chamber connecting pipe 230 disposed on an upper side of the tub 24 in order to connect the inside of the tub 24 and the condensing chamber 212.

The condensing chamber 212 according to the present embodiment may have a plate shape which is hollow inside. As having the plate shape, the condensing chamber 212 according to the present embodiment may perform heat exchange with the heat exchange chamber 112 in a wider area. The condensing chamber 212 according to the present embodiment is disposed between the cabinet 20 and the tub 24. The condensing chamber 212 according to the present embodiment is disposed between the cabinet 20 and the heat exchange chamber 112 of the heat exchange module 110. The heat exchange chamber 112 in which external air flows is disposed on one side surface of the condensing chamber 212. The cabinet 20 defining the external appearance of the dishwasher 10 is disposed on the other side surface of the condensing chamber 212.

Air flowing in the condensing chamber 212 may exchange heat with external air flowing in the heat exchange chamber 112 disposed on one side surface of the condensing chamber 212, and accordingly, hot and humid air may be condensed. In addition, the air flowing in the condensing chamber 212 may exchange heat with the outside of the dishwasher 10 through the cabinet 20 disposed on the other side of the condensing chamber 212. In this case, the air flowing in the condensing chamber 212 exchanges heat through both side surfaces of the condensing chamber 212, and therefore, heat exchange may be performed more effectively.

The condensed water discharge hole 226 through which condensed water is discharged is formed at a lower portion of the condensing chamber 212 according to the present embodiment. The condensed water discharge hole 226 according to the present embodiment enables the condensing chamber 212 and the heating module 150 to communicate with each other.

The condensed water discharge guide 224 for guiding condensed water flowing along the condensed water guide 218 and 220 toward the condensed water discharge hole 226 is formed in the condensing chamber 212 according to the present embodiment. The condensed water discharge guide 224 is disposed below the condensed water discharge hole 226, and guides condensed water toward the external air inflow hole 82 formed on a side surface of the tub 24.

The condensing chamber 212 according to the present embodiment may include: a first surface 226a forming a partition with respect to the heat exchange module 110; a second surface 226b disposed to oppose the cabinet 20; a front surface 227a connecting the first surface 226a and the second surface 226b at the front of the condensing chamber 212; and a rear surface 227b connecting the first surface 226a and the second surface 226b at the rear of the condensing chamber 212.

The upper part 228a of the condensing chamber 212 according to the present embodiment may form a wide rectangular extension surface and have a flow path guide disposed therein. The lower part 228b of the condensing chamber 212 according to the present embodiment is disposed below the upper part 228a of the condensing chamber 212, and has a shape which decreases in area compared to the upper part 228a.

The upper part 228a of the condensing chamber 212 is connected to the condensing chamber connecting pipe 230 through which internal air of the tub 24 is introduced from above. The condensing chamber 212 according to the present embodiment is connected to the condensing chamber connecting pipe 230 at the rear of the upper surface of the condensing chamber 212. The flow path guide 214 and 216 for guiding air flowing in the condensing chamber 212 is disposed in the upper part 228a of the condensing chamber 212. The condensed water discharge hole 226 of the condensing chamber 212 is formed in the lower part 228b of the condensing chamber 212. The condensed water discharge guide 224 is disposed in the lower part 228b of the condensing chamber 212. The condensing chamber exhaust part 229 connected to the exhaust fan module 240 is disposed at the lower end of the lower part 228b of the condensing chamber 212.

A condensing flow path, along which air discharged from the tub 24 flows, is formed in the condensing chamber 212. The condensing flow path may be formed by the flow path guide 214 and 216 formed in the condensing chamber 212. A length of the condensing flow path may be adjusted by the flow path guide 214 and 216. The flow path guide 214 and 216 may be installed in consideration of a flow rate and a heat-exchanged degree of air.

The flow path guide 214 and 216 according to the present embodiment may include: a first flow path guide 214 which changes a direction of air introduced through the condensing chamber connecting pipe 230, and a second flow path guide 216 which changes a direction of air flowing along the flow path guide 216. The first flow path guide 214 and the second flow path guide 216 are connected from the first surface 226a to the second surface 226b to adjust a direction of air flowing in the condensing chamber 212.

The first flow path guide 214 and the second flow path guide 216 are disposed in the upper part 218a of the condensing chamber 212. However, this is merely an example, and the first flow path guide 214 and the second flow path guide 216 may be installed even in the lower part 228b of the condensing chamber 212.

The first flow path guide 214 according to the present embodiment is disposed below the condensing chamber connecting pipe 230, and the first flow path guide 214 may be disposed to be inclined with respect to a direction of a flow path formed in the condensing chamber connecting pipe 230. The first flow path guide 214 according to the present embodiment extends forward from the rear surface 227b.

The second flow path guide 216 according to the present embodiment is disposed below the first flow path guide 214. Accordingly, condensed water fallen from the first flow path guide 214 may fall on the second flow path guide 216. The second flow path guide 216 may have a bent shape so that the air changes its direction to flow downward.

The second flow path guide 216 is disposed below an end portion of the first flow path guide 214. A sloped surface of the front surface 227a or the condensed water discharge guide 224 is disposed below an end portion of the second flow path guide 216. Accordingly, condensed water fallen from the second flow path guide 216 may fall on a first side cross-sectional surface or the condensed water discharge guide 164 and flow to the condensed water discharge hole 226.

The condensing chamber 212 discharges air, introduced from the top, to the bottom. The first flow path guide 214 and the second flow path guide 216 may change a direction of air flowing from the top to the bottom in the condensing chamber 112. Air introduced into the condensing chamber 212 from the condensing chamber connecting pipe 230 may flow forward by the first flow path guide 214 and flow backward by the second flow path guide 216. The first flow path guide 214 and the second flow path guide 216 maintain a flow rate of air flowing in the condensing chamber 212 within a predetermined range, and increase a heat-exchange area of air passing through the condensing chamber 212.

The first flow path guide 214 and the second flow path guide 216 may increase a length of a flow path of air flowing in the chamber 212, thereby increasing a condensing degree of hot and humid air discharged from the tub 24.

The condensed water guide 218 and 220, which guides movement of condensed water in air flowing in the condensing chamber 212, is formed in the condensing chamber 212.

The condensed water guide 218 and 220 according to the present embodiment is disposed below the flow path guide 214 and 216. The condensed water guide 218 and 220 guides condensed water, formed along an inner side surface of the condensing chamber 212, to flow toward the external air inflow hole 82 formed on a side surface of the tub 24. The condensed water guide 218 and 220 according to the present embodiment includes a first condensed water guide 218 formed on one inner sidewall surface of the condensing chamber 212, and a second condensed water guide 220 formed on the other sidewall surface of the condensing chamber 212. The first condensed water guide 218 according to the present embodiment protrudes inward from the first surface 226a, and the second condensed water guide 220 protrudes inward from the second surface 226b. The condensed water guide 218 and 220 according to the present embodiment is formed to be inclined in a downward and forward direction.

The condensed water guide 218 and 220 according to the present embodiment is formed to be inclined downward toward the front surface 127a from the rear surface 227b. The condensed water guide 218 and 220 according to the present embodiment is disposed at a position higher than that of the condensed water discharge guide 224. The condensed water guide 218 and 220 according to the present embodiment is disposed at a position higher than that of the condensed water discharge hole 226.

A plurality of first condensed water guides 218 and a plurality of condensed water guides 220 may be disposed in the condensing chamber 212 according to the present embodiment. The plurality of first condensed water guides 218 and the plurality of second condensed water guides 220 according to the present embodiment may be disposed above the condensed water discharge guide 224.

The condensed water discharge guide 224 according to the present embodiment guides condensed water, created in the condensing chamber 212, toward the external air inflow hole 82 formed on a side surface of the tub 24, so that the condensed water flows into the tub 24.

The condensing chamber connecting pipe 230 according to the present embodiment is connected to the internal air discharge hole 80 formed on the upper surface of the tub 24. The condensing water connecting tube 230 according to the present embodiment delivers air in the tub 24 into the condensing chamber 212. The condensing chamber connecting pipe 230 according to the present embodiment is disposed on the upper side of the tub 24.

The condensing chamber connecting pipe 230 according to the present embodiment is disposed on the upper side of the tub 24 and enables the inside of the tub 24 and the condensing chamber 212 to communicate with each other. One end of the condensing chamber connecting pipe 230 is connected to the internal air discharge hole 80 disposed on the tub 24, and the other end of the condensing chamber connecting pipe 230 is connected to an upper rear portion of the condensing chamber 212.

The condensing chamber connecting pipe 230 according to the present embodiment has a sloped surface 232 at a portion extending upward from the internal air discharge hole 80 of the tub 24, the sloped surface 232 which increases upward in area. The condensing chamber connecting pipe 230 according to the present embodiment extends along the upper surface 29 of the tub 24 and is connected to the condensing chamber 212. The condensing chamber connecting pipe 230 extending along the upper surface 29 of the tub 24 may be formed downward toward the internal air discharge hole 80.

Due to the sloped surface 232 formed over the circulator entry hole 80 of the condensing chamber connecting pipe 230 and the structure of the condensing chamber connecting pipe 230 inclined along the upper surface 29 of the tub 24, wash water sprayed by a spray nozzle toward the condensing chamber connecting pipe 230 in the tub 24 may flow back to the internal air discharge hole 80 of the tub 24. Such a structure of the condensing chamber connecting pipe 230 may prevent wash water sprayed by the spray nozzle in the tub 24 from flowing into the condensing chamber 212 of the condensing module 210.

<Exhaust Fan Module>

The exhaust fan module 240 according to the present embodiment may be disposed below the tub 24. The exhaust fan module 240 according to the present embodiment is connected to the condensing module 210. The exhaust fan module 240 discharges air, discharged from the condensing chamber 212, to the outside of the cabinet 20.

The exhaust fan module 240 according to the present embodiment may discharge air in a direction forward or rearward of the dishwasher 10. However, air having passed through the condensing module 210 is discharged from the tub 24, and thus it is preferable that the exhaust fan module 240 is disposed in a direction forward of the cabinet 20. The exhaust fan module 140 according to the present embodiment may include an exhaust fan 242 that enables air in the condensing module 210 to flow. The exhaust fan 142 according to the present embodiment is disposed below the tub 24.

The exhaust fan 242 according to the present embodiment may be connected to the external air supply fan 142. The exhaust fan 242 according to the present embodiment may be configured as a may be configured as double fans to one motor, along with the external air supply fan 142. In this case, the exhaust fan 242 and the external air supply fan 142 may be disposed on the same rotational shaft. Accordingly, the exhaust fan 242 and the circulating fan 142 operate by one motor, thereby introducing external air and discharging air from the tub 24.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A dishwasher, comprising:
   a cabinet that defines an external appearance of the dishwasher;
   a tub that is located in the cabinet and that defines a wash space configured to receive one or more objects to be washed;
   a heat exchange module that is located between the tub and the cabinet, that defines a heat-exchange space configured to receive external air, and that is configured to guide the external air toward the tub; and
   a condensing module that is located between the heat exchange module and the cabinet, that is configured to perform heat exchange between air discharged from the tub and the external air flowing in the heat exchange module, and that is configured to discharge the air discharged from the tub to an outside of the cabinet, wherein the condensing module comprises:
- a condensing chamber that is located between the cabinet and the heat exchange module and that defines a condensing space configured to allow the air discharged from the tub to flow therein, and
- a condensing chamber connecting pipe that is located at an upper side of the tub and that connects an inside of the tub to the condensing chamber, wherein the heat exchange module comprises a heat exchange chamber disposed between the tub and the condensing chamber to perform heat exchange with the condensing chamber, wherein the heat exchange chamber has a first heat exchange surface in contact with the tub, and a second heat exchange surface in contact with the condensing chamber, and wherein the condensing chamber has a first surface in contact with the heat exchange chamber, and a second surface in contact with the cabinet.

2. The dishwasher of claim 1, further comprising a heating module configured to supply heat to air flowing through the heat exchange module and guide heated air to an inside of the tub.

3. The dishwasher of claim 2, wherein the heating module comprises:
- a heater configured to supply heat to air flowing through the heat exchange module; and
- a hot air tube configured to guide air heated by the heater to the inside of the tub.

4. The dishwasher of claim 3, wherein the hot air tube defines:
- an ascending flow path configured to guide heated air in an upward direction; and
- a descending flow path configured to receive air from the ascending flow path and to guide the air from the ascending flow path in a downward direction, and
- wherein the heater is located vertically below the ascending flow path.

5. The dishwasher of claim 1, further comprising an external air supply fan module configured to cause external air to be supplied to an inside of the tub through the heat exchange module.

6. The dishwasher of claim 1, wherein the condensing chamber comprises:
- a first flow path guide located in the condensing chamber and configured to guide air flowing in the condensing chamber; and
- a condensed water guide that is located in the condensing chamber, that is located vertically below the first flow path guide, and that is configured to guide condensed water generated in the condensing chamber.

7. The dishwasher of claim 6, wherein the condensing chamber defines a condensed water discharge hole located vertically below the condensed water guide and configured to discharge the condensed water generated in the condensing chamber to the inside of the tub, and
wherein the condensing chamber further comprises a condensed water discharge guide configured to guide the condensed water guided through the condensed water guide toward the condensed water discharge hole.

8. The dishwasher of claim 7, wherein the tub defines:
- an internal air discharge hole located at an upper surface of the tub and configured to supply air from the tub to the condensing module; and
- an external air inflow hole located at a side surface of the tub and configured to introduce air flowing in the heat exchange module to the tub, and
- wherein the condensed water discharge guide is configured to guide condensed water generated in the condensing chamber toward the external air inflow hole.

9. The dishwasher of claim 8, further comprising a condensing chamber connecting pipe that is connected to the internal air discharge hole at the upper surface of the tub and that is configured to guide air from the tub to the condensing module,
wherein the condensing chamber connecting pipe has a sloped surface that is inclined with respect to the upper surface of the tub and that extends upward from the internal air discharge hole, a cross-sectional area of the condensing chamber connecting pipe increasing in an upward direction from the internal air discharge hole.

10. The dishwasher of claim 1, wherein the heat exchange module comprises:
an external air inflow part that is located forward of the heat exchange chamber, the external air inflow part having a front surface that defines an external air inlet configured to introduce external air to the heat exchange module.

11. The dishwasher of claim 10, wherein the external air inlet is defined at a lower portion of the front surface of the external air inflow part.

12. The dishwasher of claim 10, wherein the heat exchange chamber comprises a second flow path guide that is located in the heat exchange chamber and that is configured to guide external air from the external air inlet in a rearward and upward direction.

13. The dishwasher of claim 1, further comprising an exhaust fan configured to cause air flowing in the condensing module to be discharged to the outside of the cabinet.

14. A dishwasher, comprising:
- a cabinet that defines an external appearance of the dishwasher;
- a tub that is located in the cabinet and that defines a wash space configured to receive one or more objects to be washed;
- an external air supply unit that is configured to perform heat exchange between air introduced from an outside of the tub and air discharged from the tub and that is configured to supply heat-exchanged air to an inside of the tub; and
- an air discharge unit that is configured to condense air received from the tub through heat exchange with external air flowing in the external air supply unit and that is configured to discharge condensed air to the outside of the tub, wherein the external air supply unit comprises:
- a heat exchange module that is located between a side surface of the tub and an inner surface of the cabinet, that defines a heat-exchange space configured to receive the external air, and that extends along the side surface of the tub, and wherein the air discharge unit comprises:
- a condensing module that is located between a side surface of the heat exchange module and the inner surface of the cabinet, that is configured to receive air from the tub and perform heat exchange between the air received from the tub and the external air flowing in the heat exchange module.

15. The dishwasher of claim 14, wherein the tub comprises:

an upper surface that defines an air discharge hole configured to discharge air from the tub to the condensing module, and wherein the side surface of the tub defines an external air inflow hole configured to receive at least one of air flowing in the heat exchange module or condensed water generated in the condensing module.

16. The dishwasher of claim 14, wherein the condensing module comprises:

a condensing chamber that is located between the side surface of the heat exchange module and the inner surface of the cabinet and that defines a condensing space configured to allow air discharged from the tub to flow therein; and a condensing chamber connecting pipe that is located at an upper side of the tub and that communicates an inside of the tub to the condensing chamber.

17. The dishwasher of claim 14, further comprising a door disposed at a front side of the cabinet and configured to open and close a front opening defined in the front side of the cabinet, and wherein the side surface of the tub is a lateral side surface of the tub that faces the inner surface of the cabinet.

18. The dishwasher of claim 14, wherein the heat exchange module has a first heat exchange surface in contact with the side surface of the tub, and a second heat exchange surface in contact with the condensing module, and wherein the condensing module has a first surface in contact with the side surface of the heat exchange module, and a second surface in contact with the inner surface of the cabinet.

\* \* \* \* \*